United States Patent
Ghai et al.

(10) Patent No.: US 8,867,346 B2
(45) Date of Patent: Oct. 21, 2014

(54) METHOD, SYSTEM, AND COMPUTER PROGRAM PRODUCT FOR PROVIDING NETWORK DATA FLOW ANALYSIS AND ROUTING

(75) Inventors: Narinder Ghai, Holmdel, NJ (US); Roger Aboujaoude, Ocean Township, NJ (US); William J. Hanselmann, Sleepy Hollow, IL (US); Michele Macauda, Monroe, CT (US); Sorabh Saxena, Edison, NJ (US); Malvinder Singh, Califon, NJ (US); Richard Williams, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 639 days.

(21) Appl. No.: 12/948,100

(22) Filed: Nov. 17, 2010

(65) Prior Publication Data

US 2012/0124197 A1    May 17, 2012

(51) Int. Cl.
*H04L 12/26* (2006.01)
*G06F 15/173* (2006.01)
*G06F 9/46* (2006.01)

(52) U.S. Cl.
CPC .............. *H04L 43/04* (2013.01); *H04L 43/12* (2013.01)
USPC ......... 370/230; 370/235; 705/7.26; 705/7.27; 709/224; 709/238; 718/102

(58) Field of Classification Search
CPC .............. H04L 29/06; H04L 29/08072; H04L 29/08144; H04L 29/12009; H04L 41/22; H04L 43/00; H04L 45/00; H04L 47/10; H04L 47/15; H04L 47/30; H04L 47/32; H04L 47/2441; H04L 12/2602; H04L 12/5693; H04L 12/5695; G06Q 10/06; G06Q 10/10; G06Q 10/063; G06Q 10/0631; G06Q 10/0633; G06Q 10/06316; H04Q 11/0478; G06F 9/52; G06F 9/3851; G06F 9/4843; G06F 9/4881; G06F 9/4887
USPC .......... 709/224, 238; 370/230, 235; 705/7.26, 705/7.27; 718/102
See application file for complete search history.

(56) References Cited

U.S. PATENT DOCUMENTS

| | | | |
|---|---|---|---|
| 2003/0088671 A1* | 5/2003 | Klinker et al. | 709/225 |
| 2005/0204001 A1* | 9/2005 | Stein et al. | 709/206 |
| 2008/0114668 A1* | 5/2008 | Peters et al. | 705/32 |
| 2010/0303225 A1* | 12/2010 | Shashkov et al. | 379/265.11 |

* cited by examiner

*Primary Examiner* — Alpus H Hsu
*Assistant Examiner* — Dharmesh Patel
(74) *Attorney, Agent, or Firm* — Cantor Colburn LLP

(57) ABSTRACT

Data flow analysis and routing processes include monitoring a process of a workflow, intercepting data traffic for data entered for the process, and identifying a communication path of a destination location for the data traffic. The method also includes verifying compliance of the process by applying business rules to the data, and notifying an entity of any non-compliance identified from the verification.

19 Claims, 3 Drawing Sheets

METHOD, SYSTEM, AND COMPUTER PROGRAM PRODUCT FOR PROVIDING NETWORK DATA FLOW ANALYSIS AND ROUTING

BACKGROUND

Exemplary embodiments relate generally to data processing and, more particularly, to providing network data flow analysis and routing.

Most enterprises today rely upon set processes and workflow procedures to maintain consistency and efficiency of its daily operations. In an ordering system, e.g., an order for a product or service is generated, released from one system, and flows to another system for further processing until the order is completed (e.g., provisioned, commissioned, and billed). Some orders are individually selected for quality assurance during or after the workflow process. Similarly, based on business logic, some orders may require human intervention where others proceed directly through an automated workflow process. The entire process may take several days or weeks to complete.

BRIEF SUMMARY

Exemplary embodiments include a method for providing data flow analysis and routing. The method includes monitoring a process of a workflow via a data flow analyzer executing on a computer processor, intercepting data traffic for data entered for the process, and identifying a communication path of a destination location for the data traffic. The method also includes verifying compliance of the process by applying business rules to the data, and notifying an entity of any non-compliance identified from the verification.

Additional exemplary embodiments include a system for providing data flow analysis and routing. The system includes a host system computer and logic executing on the host system computer. The logic implements a method. The method includes monitoring a process of a workflow, intercepting data traffic for data entered for the process, and identifying a communication path of a destination location for the data traffic. The method also includes verifying compliance of the process by applying business rules to the data, and notifying an entity of any non-compliance identified from the verification.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains exemplary embodiments, together with features, by way of example with reference to the drawings.

DETAILED DESCRIPTION OF EXEMPLARY EMBODIMENTS

Exemplary embodiments provide data flow analysis and routing that performs analysis on processes in a workflow (either in a testing phase or operational phase) to determine any potential issues and to provide the ability to take actions based upon the results of the analysis. The data flow analysis and routing features gather real time data from individual processes and applications. A given order or a process may exchange multiple users and applications during a workflow, which can lead to errors that unknowingly flow to other users and applications. The data flow analysis and routing features identify these errors or other conditions and implement one or more actions in response to any detected errors or conditions.

The exemplary embodiments are described herein, for illustrative purpose, with respect to a business enterprise engaged in selling goods and/or services customers. However, it will be understood by those skilled in the art that the data flow analysis and routing processes may be implemented in any environment that operates using one or more workflow processes (e.g., in a manufacturing environment).

Figure 1:
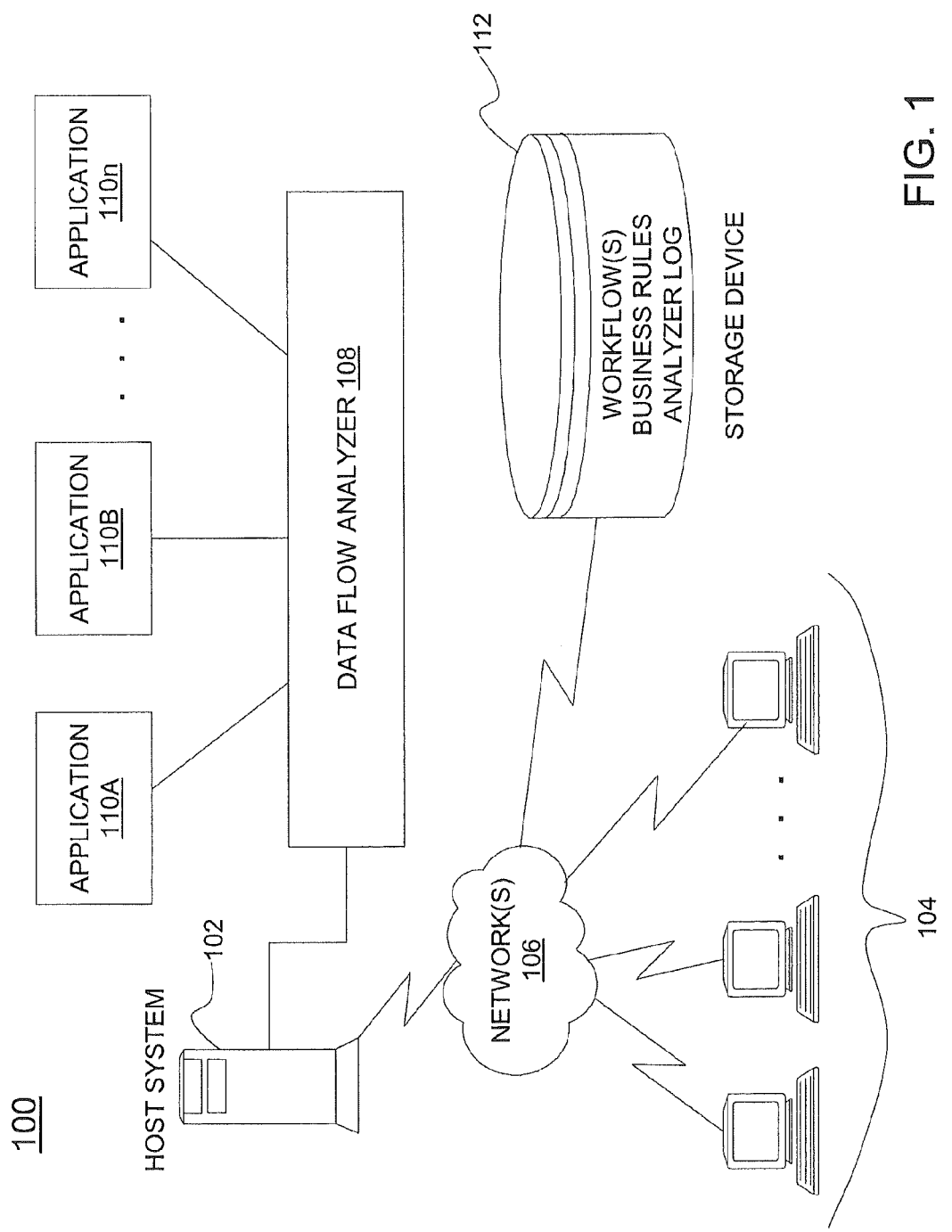
FIG. 1 illustrates an example of a system upon which data flow analysis and routing may be implemented in accordance with an exemplary embodiment.

Turning now to FIG. 1, a system 100 upon which data flow analysis and routing may be implemented will now be described in accordance with an exemplary embodiment. The system 100 includes a host system 102 in communication with user devices 104 over one or more networks 106.

The host system 102 may be part of an enterprise (e.g., a commercial business) that implements the data flow analysis and routing processes on its operational data and workflow processes.

In an exemplary embodiment, the host system 102 executes computer instructions for implementing the data flow analysis and routing processes as will be described herein. The host system 102 may comprise a high-speed computer processing device, such as a mainframe computer, to manage the volume of operations governed by an entity for which the data flow analysis and routing processes are performed.

The system 100 includes the user devices 104 through which users at one or more geographic locations may contact the host system 102. User devices 104 may include wireline or wireless communication devices, such as general-purpose computers, laptops, personal digital assistants, and/or cellular telephones, to name a few. If the user devices 104 are personal computers, the processing described herein may be shared by user devices 104 and the host system 102 (e.g., by providing an applet to the user devices 104). User devices 104 may be operated by authorized users of the enterprise managed via the host system 102.

A user device 104 may be coupled to the host system 102 through multiple networks 106 (e.g., intranet and Internet) so that not all user devices 104 are coupled to the host system 102 through the same network. One or more of the user devices 104 and the host system 102 may be connected to the networks 106 in a wireless fashion. In one embodiment, the networks 106 include an intranet and one or more user devices 104 execute a user interface application (e.g. a web browser) to contact the host system 102 through the networks 106. Additionally, the networks 106 may include circuit-switched and/or packet-switched technologies and devices, such as routers, switches, hubs, gateways, etc., for facilitating communications. The networks 106 may include wireline and/or wireless components utilizing, e.g., IEEE 802.11 standards for providing over-the-air transmissions of communications.

The networks 106 may be implemented in a wireless fashion, e.g., using wireless protocols and technologies, such as WiFi, WiMax, Bluetooth™, etc. The networks 106 may include a cellular communications network, a fixed wireless network, a wireless local area network (LAN), a wireless wide area network (WAN), a personal area network (PAN), a virtual private network (VPN), an intranet or any other suitable network, and the networks 106 may include equipment for receiving and transmitting signals, such as a cell tower, a mobile switching center, a base station, and a wireless access point.

Also shown in FIG. 1 is a storage device 112 in communication with the host system 102. The storage device 112 includes a data repository with one or more databases for facilitating the data analysis and routing functions. The databases may include e.g., defined workflows, activity logs, and related information as described further herein. The storage device 112 is logically addressable as a consolidated data source across a distributed environment that includes networks 106. Information stored in the storage device 112 may be retrieved and manipulated via the host system 102 and alternatively, via the host system 102 and the user devices 104.

The host system 102 depicted in the system 100 of FIG. 1 may be implemented using one or more servers operating in response to a computer program stored in a storage medium accessible by the server. The host system 102 may operate as a network server (e.g., a web server) to communicate with the user devices 104. The host system 102 handles sending and receiving information to and from the user devices 104 and can perform associated tasks. The host system 102 may also include a firewall to prevent unauthorized access to the host system 102 and enforce any limitations on authorized access. For instance, an administrator may have access to the entire system and have authority to modify portions of the system. A firewall may be implemented using conventional hardware and/or software as is known in the art.

Figure 3:
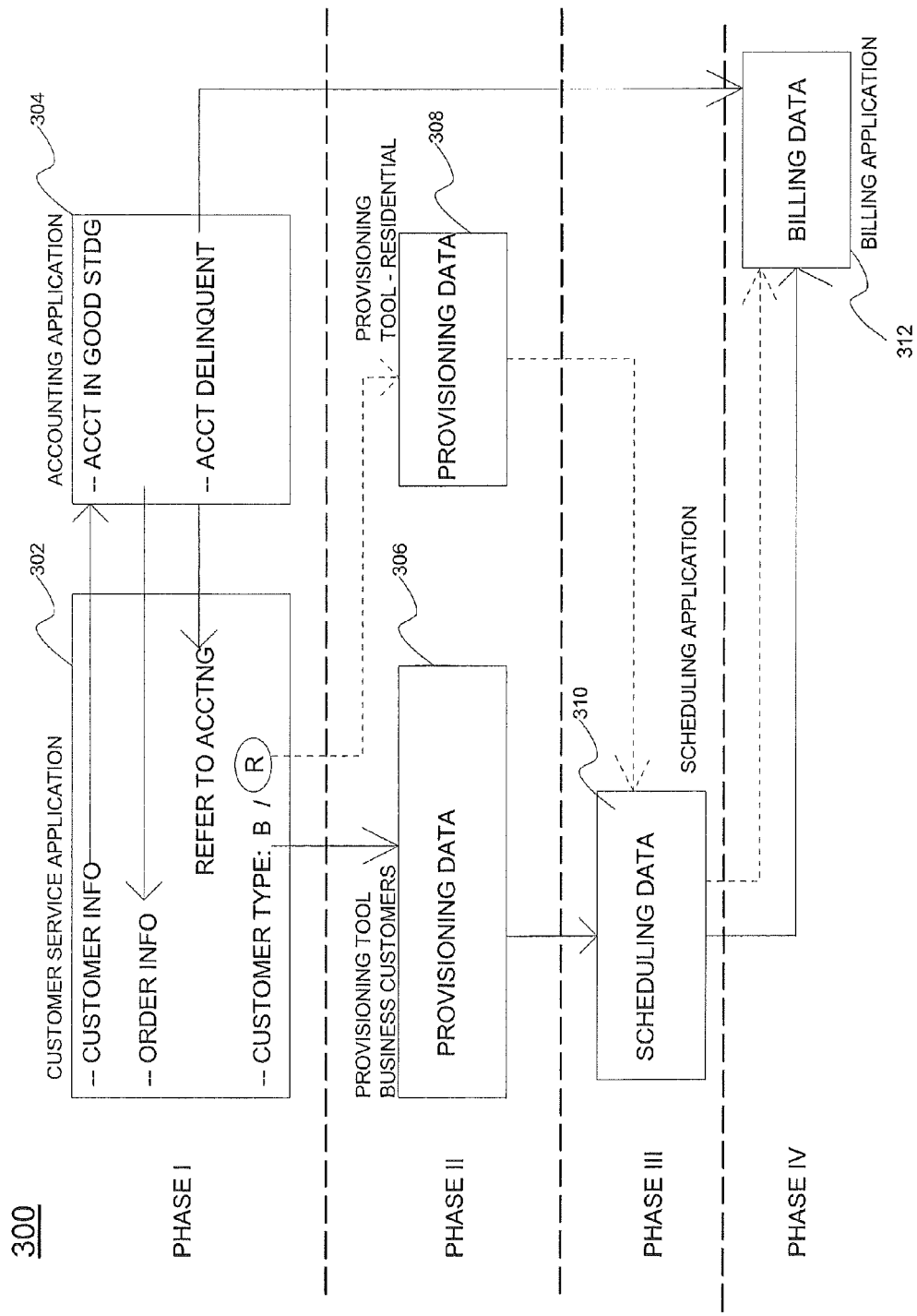
FIG. 3 illustrates a functional diagram of a sample data flow and routing process in accordance with exemplary embodiments.

The host system 102 may also operate as an application server. The host system 102 executes one or more applications 110A-110n in furtherance of its business operations. By way of a non-limiting example, as shown in FIG. 3 such applications 110A-100n may include a customer service application 302, an accounting application 304, a provisioning tool for business customers 306, a provisioning tool for residential customers 308, a scheduling application 310, and a billing application 312. In this example, the applications represent a customer order and billing system. A user of one of user devices 104 accesses one of the applications 110A-110n, e.g., via the host system 102, and initiates a workflow process, which is defined by one or more tasks or process steps. The workflow may also be defined by phases that each represents a particular grouping of tasks. A sample phased workflow is shown and described in FIG. 3.

The host system 102 executes one or more computer programs to provide the data analysis and routing functions. These one or more computer programs are referred to herein as a data flow analyzer 108. The data flow analyzer 108 is configured to monitor the workflow performed via the applications 110A-110n and ensure that the processes defined by the workflow are performed as dictated by the particular requirements of the workflow (e.g., all data fields in an application file are completed and the information generated through data entry is conveyed to required entities or applications). In an exemplary embodiment, the data flow analyzer 108 is implemented as an application/network analyzer (e.g., a 'sniffer') that intercepts network traffic, e.g., data packets in a switched network that include the networks 106, and monitors the traffic for various conditions, such as to ensure accuracy in the data entry and flow of data within and among the applications 110A-100n. In addition, the data flow analyzer 108 may be configured to analyze the traffic to ensure the security and integrity of the system's 100 data or compliance with some regulatory agency, identify and correct any network issues (e.g., error conditions, system failures), and monitor and adjust bandwidth availability. The data flow analyzer 108 may provide detailed, on-demand results of the traffic and data analysis to users of user devices 104. In addition, using the order generation and billing example described above, the data flow analyzer 108 may be configured to provide these results prior to order dispatch such that any errors or non-compliances detected as a result of the analyses can be addressed before an order is executed. These and other features of the data analysis and routing processes will be described further herein.

As indicated above, the data analysis and routing processes may be shared by the user devices 104 and the host system 102 by providing an application (e.g., java applet) to the user devices 104. Alternatively, the user devices 104 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

The system 100 implements data analysis and routing processes as described herein. In an exemplary embodiment, the data analysis and routing processes include a user interface for enabling one or more users (e.g., individuals of user devices 104) to enter data used by the data analysis and routing processes, as well as receive data provided by the data analysis and routing processes. The user interface may be implemented via the data flow analyzer 108.

As indicated above, the exemplary data analysis and routing features provide data flow analysis and routing that performs analysis on processes in a workflow (either in a testing phase or operational phase) to determine any potential issues and to provide the ability to take actions based upon the results of the analysis. The data flow analysis and routing features gather real time data from individual processes and applications and store the data in a log (e.g., the analyzer log in storage device 112). A given order or a process may exchange multiple users and applications during a workflow, which can lead to errors that unknowingly flow to other users and applications. The data flow analysis and routing features identify these errors or other conditions and implement one or more actions in response to any detected errors or conditions. The data flow analysis and routing features apply business rules to the stored data in the log to identify deviations from known work flow patterns (e.g., a projected work flow for a business process), discrepancies in data entered (e.g., by comparing data previously entered into a particular file), and non-compliances with various policies (e.g., system bandwidth capabilities, system security procedures, etc.).

Figure 2:
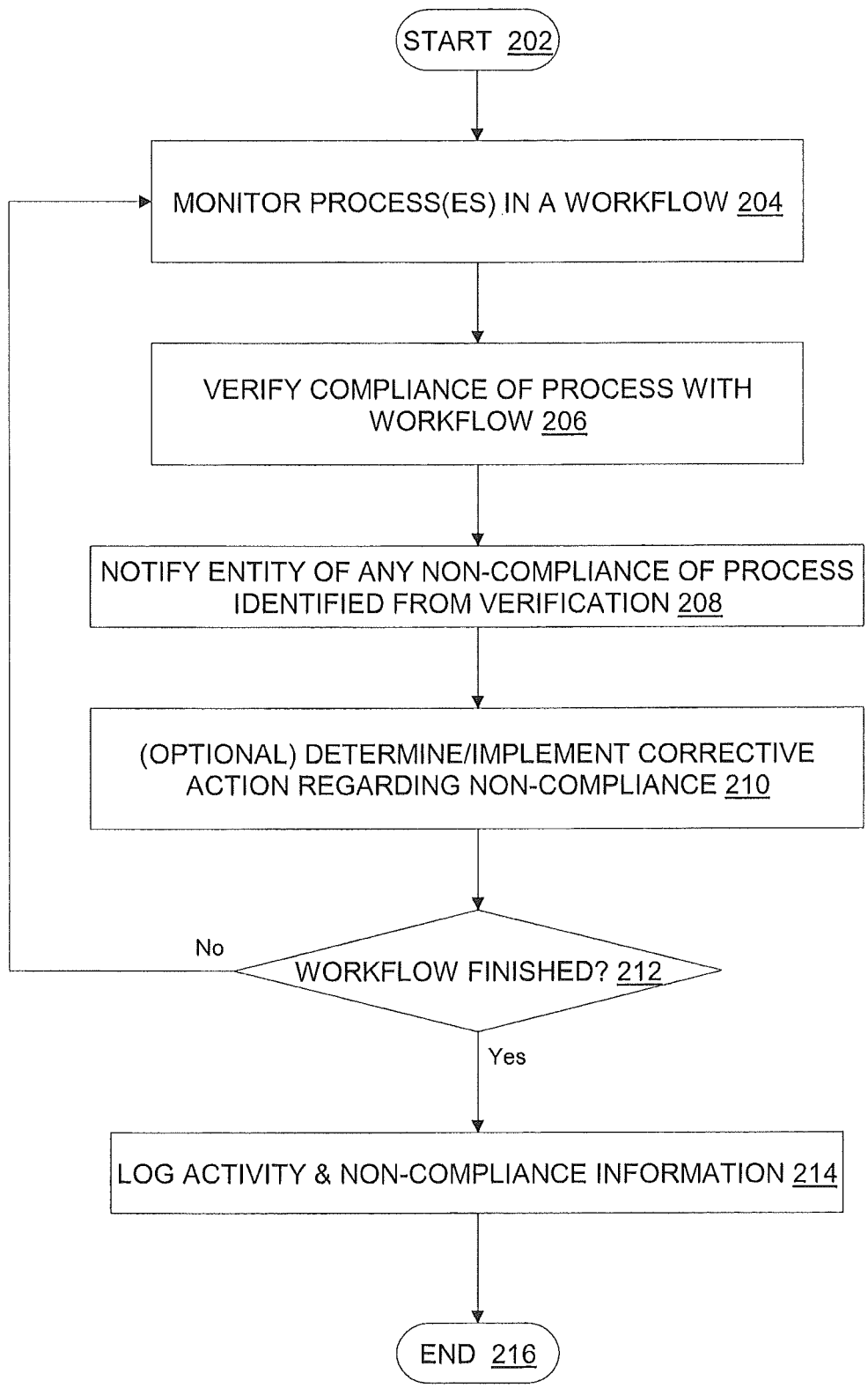
FIG. 2 illustrates a flow diagram describing a process for implementing the data flow analysis and routing in accordance with exemplary embodiments.

FIG. 2 illustrates a flow diagram describing a process for implementing the data analysis and routing processes, and FIG. 3 illustrates a functional diagram of a sample data flow process managed via the data analysis and routing processes described herein.

The process described in FIG. 2 assumes that a user (e.g., a user of one of user devices 104) has accessed an application (e.g., application 110A) via the host system 102 in order to perform one or more tasks identified in a defined workflow associated with the business enterprise managed by the host system 102.

The process begins at step 202, whereby the data flow analyzer 108 monitors the workflow process implemented by the user by intercepting data traffic for data entered via the application 110A for the process at step 204. The monitoring may include identifying a communication path of a destination location for the data traffic.

At step 206, the data flow analyzer 108 verifies compliance of the process by applying business rules to the data. The business rules may be defined such that a process is determined to be in compliance if one or more defined conditions have been met. For example, the process may be determined to be in compliance if the all the data entered into a file provided by an application (e.g., application 110A) is completed. In another example, the process may be determined to be in compliance if the data entered into the data fields in the file is accurate. In a further example, the process may be determined to be in compliance if the process flow between process steps and/or applications is correctly followed (e.g., the process step proceeds according to a pre-defined flow). In a further example, the process may be determined to be in compliance if it is implemented in accordance with one or more regulations, system or data security procedures, bandwidth capacities, or other type of desired conditions. For example, the data flow analyzer 108 may probe one or more systems or applications to determine if IP address and network capacities are available for a given port speed and location. The data flow analyzer 108 may also be configured to probe network configuration, components, and connectivity to determine if the managed network components are supported. In addition, the data flow analyzer 108 may be configured to probe various system platforms to determine if the port and permanent virtual circuit (PVC) speeds are supported. Vendor and local access arrangements may be identified by the data flow analyzer 108, e.g., by probing Integrated Global Offer Platform (IGLOO) and/or Next Generation Global Network-International (NGGN-I). Additionally, the data flow analyzer 108 may be configured with business logic to compute an average amount of time it takes for a process to complete. The above-described functionality may be implemented and results of these functions may be displayed to a user for review and analysis.

If a non-compliance is determined in response to the verification, the data flow analyzer 108 may be configured to perform a compliance-based action in response to the non-compliance. The compliance-based action may include sending a notification to one or more entities, determining an action that corrects the non-compliance, and implementing the corrective action. Examples of actions may include providing a user with guidance on correcting an error or non-compliance (e.g., errors in code, data, or environmental related issues). Once the error is corrected, the data flow analyzer 108 may be configured to reassess the process and generate a report. The process flow history may be stored accessed by a user when desired. A user may be notified (e.g., via SMS communication or email) of any critical issues encountered if the user is working offline to the data flow analyzer 108. Completed processes (e.g., orders) may be scanned in the background and shared via the user interface, as well as exported to a spreadsheet file. The data collected by the data flow analyzer 108 may be used to evaluate the performance and efficiency of one or more users (e.g., users of user devices 104) or one of applications 110A-110n. A site verification may be performed by the data flow analyzer 108 to verify a site's data quality and integrity issues across applications in production and testing (e.g., reporting billing charges verses provisioning parameters mismatches). This feature may be helpful for migration as well as inventory verification before initiating any change order on site in production or testing. An order monitor may be implemented to act as a control box to monitor the activities of orders in process or completed orders.

As indicated above, the process is verified for compliance with one or more conditions by applying business rules. In one example, the process is verified by comparing the destination location of the process to destination locations stored in the log for instances of the process conducted over a period of time. The entity (e.g., user of a user device 104) is notified when the destination location of the process does not match a pattern of the destination locations (e.g., the projected path of the process) stored in the log.

In another example, the process is verified by determining from the data traffic for data entered via the application whether the data entered was successfully transmitted to the destination location. The entity is notified of any non-compliance when the data traffic indicates the data entered via the application was not received at the destination location.

In a further example, the process is verified by parsing the data in the data traffic, and comparing the data in data fields of the process to data stored in data fields of the process in the log for instances of the process conducted over a period of time. The entity is notified of any non-compliance when the data in the data fields of the process do not match the data in the data fields stored in the log.

At step 208, the data flow analyzer 108 generates and transmits a notification to an entity (e.g., one of user devices 104) notifying the entity of any non-compliance identified from the verification performed in step 206. The compliance-based actions may be defined for various process steps in the defined workflows via a user interface provided by the data flow analysis and routing processes.

At step 210, the data flow analyzer 108 may optionally be configured to implement corrective actions with respect to the non-compliance as described above.

At step 212, the data flow analyzer 108 determines whether the workflow process has completed. If not, the process returns to step 204 whereby the data flow analyzer 108 continues to monitor the process flow. In an exemplary embodiment, the monitoring by the data flow analyzer 108 is implemented across applications 110A-100n; thus, as the process proceeds through the workflow to other applications (e.g., 110B), the data flow analyzer 108 continues to monitor and track the activities performed on the process. Otherwise, the activities conducted with regard to the process implemented by the user are stored in the analyzer log at step 214, and the process ends at step 216.

As described above, the exemplary data analysis and routing processes may be implemented across processes and across applications (e.g., applications 110A-110n). In addition, the data analysis and routing processes may be implemented across one or more defined phases of a workflow process. As shown in FIG. 3, a sample data flow and routing process for an ordering system 300 will now be described in an exemplary embodiment. As shown in FIG. 3, an enterprise's workflow is defined by four phases (Phases I-IV). Within each phase, one or more applications and related process steps are defined. For example, in Phase I, a customer service application 302 and an accounting application 304 are shown. The workflow among the processes/applications is shown by solid arrows, and a workflow followed by a user is shown with dotted arrows. Thus, the user(s) implementing the process described in FIG. 3 has not correctly followed the expected or required workflow defined by the enterprise.

In the ordering system 300 of FIG. 3, the workflow begins when a user (e.g., a user of one of user devices 104) accesses the customer service application 302 to generate an order for a customer. The application 302 provides a file (e.g., a order template or web page) in which the user is prompted to enter information in various data fields (e.g., customer information, order information, and customer type). Once the user enters the customer information, the workflow is expected to proceed to the accounting application 304 to verify whether the customer account is in good standing before authorizing a new service. Once verified that the account is in good standing, the workflow directs that the user proceed to enter the order information. However, if the customer account is not in good standing (e.g., delinquent), the workflow dictates that the user refer the customer to an accounting department to discuss the financial status of the account. In the example shown in FIG. 3, however, the user has entered the order information without first verifying the status of the account with the accounting application 304. The user enters all information in the file provided by the application 302 including selecting a customer type (B for business, R for residential). The user inadvertently enters 'R' where the customer is a business customer, and the user submits the order application from the customer service application 302 to the provisioning application 308 in Phase II, which is configured for residential customers.

A user of the provisioning tool 308 enters provisioning data for the customer and submits the provisioning information to a scheduling application 310 in Phase III. A user enters scheduling information via the application 310 and submits the information to a billing application 312 in Phase IV.

In an exemplary embodiment, the data flow analyzer 108 collects the data entered by the user(s) via the applications 302, 304, 308, 310, and 312 and compares the data with stored data in the analyzer log to determine whether any discrepancies or non-compliances exist from the process flow described in FIG. 3. At any location in the flow, once a non-compliance has been determined, the data flow analyzer 108 may be configured to perform one or more actions. For example, in a phased approach, the data flow analyzer 108 may notify all applications associated with a given phase that an error or non-compliance has been detected (e.g., in Phase I, the data flow analyzer 108 may notify both users of the customer service application 302 and the accounting application 304 that the customer information was not verified (i.e., to determine whether the customer account was in good standing) prior to completing the order form. In another approach, the data flow analyzer 108 may be configured to notify any downstream applications of a detected error. For example, when the user selects 'R' for residential customer, the data flow analyzer 108 may compare the data entered in application 302 with other applications within or across phases (e.g., billing application 312, which provides a billing record for the customer, and where the billing record indicates the customer is a business customer, not a residential customer) and notify the provisioning tool 306 that the projected path was not followed (i.e., the path to the provisioning tool for business customers 306 was not followed). Likewise, the data flow analyzer 108 may notify the provisioning tool for residential customers 308 that the process was sent to the application 308 in error. These, and other actions, such as corrective actions, may be configured via the business rules as desired.

As described above, the exemplary embodiments can be in the form of computer-implemented processes and apparatus for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing data flow analysis, comprising:
defining phases for a workflow, the defining including identifying applications implemented for each of the phases and process tasks corresponding to each of the applications;
monitoring a process of the workflow via a data flow analyzer executing on a computer processor;
intercepting data traffic for data entered for the process and identifying a communication path of a destination location for the data traffic;
verifying compliance of the process by applying business rules to the data; and
notifying an entity of any non-compliance identified from the verifying before proceeding to a next phase in the phases for the workflow;
wherein the verifying compliance of the process by applying the business rules includes:
parsing the data in the data traffic; and
comparing the data in data fields of the process to data stored in data fields of the process in a log for instances of the process conducted over a period of time;
wherein the workflow is configured for an ordering system and a first phase of the phases specifies tasks associated with a customer service application for generating an order and an accounting application for determining a financial status of a customer subject to the order, a second phase of the phases specifies tasks associated with provisioning a service for the customer, a third phase specifies tasks associated with a scheduling application, and a fourth phase of the phases specifies tasks associated with a billing application.

2. The method of claim 1, further comprising:
identifying an action that corrects the non-compliance;
implementing the action; and
storing the action with the non-compliance in a log.

3. The method of claim 1, wherein the verifying compliance of the process by applying the business rules further includes comparing the destination location of the process to destination locations stored in a log for instances of the process conducted over a period of time;
wherein notifying the entity of any non-compliance includes notifying the entity when the destination location of the process does not match a pattern of the destination locations stored in the log.

4. The method of claim 1, wherein the verifying compliance of the process by applying the business rules further includes:
determining from the data traffic for data entered whether the data entered was successfully transmitted to the destination location;
wherein notifying the entity of any non-compliance includes notifying the entity when the data traffic indicates the data entered was not received at the destination location.

5. The method of claim 1, wherein notifying the entity of any non-compliance includes notifying the entity when the data in the data fields of the process do not match the data in the data fields stored in the log.

6. The method of claim 1, wherein the monitoring further includes monitoring the process in a workflow across multiple applications.

7. A system for providing data flow analysis and routing, comprising:
a host system computer; and
logic executing on the host system computer, the logic implementing a method comprising:
defining phases for a workflow, the defining including identifying applications implemented for each of the phases and process tasks corresponding to each of the applications;
monitoring a process of the workflow;
intercepting data traffic for data entered for the process and identifying a communication path of a destination location for the data traffic;
verifying compliance of the process by applying business rules to the data; and
notifying an entity of any non-compliance identified from the verifying before proceeding to a next phase in the phases for the workflow
wherein the verifying compliance of the process by applying the business rules includes:
parsing the data in the data traffic; and
comparing the data in data fields of the process to data stored in data fields of the process in a log for instances of the process conducted over a period of time;
wherein the workflow is configured for an ordering system and a first phase of the phases specifies tasks associated with a customer service application for generating an order and an accounting application for determining a financial status of a customer subject to the order, a second phase of the phases specifies tasks associated with provisioning a service for the customer, a third phase specifies tasks associated with a scheduling application, and a fourth phase of the phases specifies tasks associated with a billing application.

8. The system of claim 7, wherein the method further comprises:
identifying an action that corrects the non-compliance; and
implementing the action.

9. The system of claim 8, wherein the method further comprises:
storing the action with the non-compliance in a log.

10. The system of claim 7, wherein the verifying compliance of the process by applying the business rules further includes comparing the destination location of the process to destination locations stored in a log for instances of the process conducted over a period of time;
wherein notifying the entity of any non-compliance includes notifying the entity when the destination location of the process does not match a pattern of the destination locations stored in the log.

11. The system of claim 7, wherein the verifying compliance of the process by applying the business rules further includes:
determining from the data traffic for data entered whether the data entered was successfully transmitted to the destination location;
wherein notifying the entity of any non-compliance includes notifying the entity when the data traffic indicates the data entered was not received at the destination location.

12. The system of claim 7, wherein notifying the entity of any non-compliance includes notifying the entity when the data in the data fields of the process do not match the data in the data fields stored in the log.

13. A computer program product for providing data flow analysis and routing, the computer program product comprising a non-transitory computer-readable storage medium having instructions embodied thereon, which when executed by a computer cause the computer to implement a method, the method comprising:
defining phases for a workflow, the defining including identifying applications implemented for each of the phases and process tasks corresponding to each of the applications;
monitoring a process of the workflow;
intercepting data traffic for data entered for the process and identifying a communication path of a destination location for the data traffic;
verifying compliance of the process by applying business rules to the data; and
notifying an entity of any non-compliance identified from the verifying before proceeding to a next phase in the phases for the workflow;
wherein the verifying compliance of the process by applying the business rules includes:
parsing the data in the data traffic; and
comparing the data in data fields of the process to data stored in data fields of the process in a log for instances of the process conducted over a period of time;
wherein the workflow is configured for an ordering system and a first phase of the phases specifies tasks associated with a customer service application for generating an order and an accounting application for determining a financial status of a customer subject to the order, a second phase of the phases specifies tasks associated with provisioning a service for the customer, a third phase specifies tasks associated with a scheduling application, and a fourth phase of the phases specifies tasks associated with a billing application.

14. The computer program product of claim 13, wherein the method further comprises:

identifying an action that corrects the non-compliance; and implementing the action.

15. The computer program product of claim 14, wherein the method further comprises:

storing the action with the non-compliance in a log.

16. The computer program product of claim 13, wherein the verifying compliance of the process by applying the business rules further includes comparing the destination location of the process to destination locations stored in a log for instances of the process conducted over a period of time;

wherein notifying the entity of any non-compliance includes notifying the entity when the destination location of the process does not match a pattern of the destination locations stored in the log.

17. The computer program product of claim 13, wherein the verifying compliance of the process by applying the business rules further includes:

determining from the data traffic for data entered whether the data entered was successfully transmitted to the destination location;

wherein notifying the entity of any non-compliance includes notifying the entity when the data traffic indicates the data entered was not received at the destination location.

18. The computer program product of claim 13, wherein notifying the entity of any non-compliance includes notifying the entity when the data in the data fields of the process do not match the data in the data fields stored in the log.

19. The computer program product of claim 13, wherein the monitoring further includes monitoring the process in a workflow across multiple applications.

* * * * *